(12) United States Patent
Biebl et al.

(10) Patent No.: US 8,794,665 B2
(45) Date of Patent: Aug. 5, 2014

(54) INFLATOR, MODULE INCLUDING AN INFLATOR, VEHICLE SAFETY SYSTEM AND METHOD OF OPERATING A VEHICLE OCCUPANT PROTECTION SYSTEM

(75) Inventors: Manfred Biebl, Stefanskirchen (DE); Michael Gabler, Mühldorf (DE); Achim Hofmann, Graf-Wartenberg-Ring (DE); Dieter Leier, Haag (DE); Ning Wei, Oberer Graben (DE)

(73) Assignee: TRW Airbag Systems GmbH, Aschau am Inn (DE)

( * ) Notice: Subject to any disclaimer, the term of this patent is extended or adjusted under 35 U.S.C. 154(b) by 0 days.

(21) Appl. No.: 13/615,719

(22) Filed: Sep. 14, 2012

(65) Prior Publication Data
US 2013/0087065 A1   Apr. 11, 2013

(30) Foreign Application Priority Data

Oct. 11, 2011   (DE) .......................... 10 2011 115 518

(51) Int. Cl.
*B60R 21/26*   (2011.01)
*B60R 21/264*   (2006.01)

(52) U.S. Cl.
USPC ............................. 280/736; 280/741; 102/704

(58) Field of Classification Search
CPC ..................... B60R 2021/26017; B60R 21/26; B60R 21/264; B60R 21/2644
USPC ........... 280/736, 737, 741; 102/530, 531, 704
See application file for complete search history.

(56) References Cited

U.S. PATENT DOCUMENTS

| | | | | |
|---|---|---|---|---|
| 3,305,319 A | * | 2/1967 | Perkins et al. ................. | 422/643 |
| 3,692,495 A | * | 9/1972 | Schneiter et al. ............. | 422/166 |
| 3,810,655 A | * | 5/1974 | Prachar ......................... | 280/736 |
| 3,813,007 A | * | 5/1974 | Doin et al. ........................ | 222/4 |
| 3,966,226 A | * | 6/1976 | Roth .............................. | 280/737 |
| 4,305,908 A | * | 12/1981 | Anisimov et al. ............. | 422/164 |
| 5,669,631 A | * | 9/1997 | Johnson et al. ............... | 280/741 |
| 5,806,884 A | | 9/1998 | Johnson et al. | |
| 6,196,583 B1 | * | 3/2001 | Ruckdeschel et al. ........ | 280/736 |
| 6,412,814 B1 | * | 7/2002 | Huber et al. ................... | 280/736 |
| 6,896,287 B2 | * | 5/2005 | Last et al. ...................... | 280/736 |
| 8,191,927 B2 | * | 6/2012 | Jordan et al. .................. | 280/741 |

(Continued)

FOREIGN PATENT DOCUMENTS

| | | |
|---|---|---|
| DE | 3026088 | 2/1981 |
| DE | 19514681 | 11/1996 |

(Continued)

*Primary Examiner* — Ruth Ilan
(74) *Attorney, Agent, or Firm* — Tarolli, Sundheim, Covell & Tummino LLP

(57) ABSTRACT

A vehicle safety system includes a module including an airbag and an inflator. The inflator includes a housing (12) in which a combustion chamber (16) containing a pyrotechnic propellant is arranged in which hot gas is generated and which housing includes at least one escape orifice (22) toward the environment of the inflator (10), as well as a coolant reservoir (24) arranged in the housing (12) in which coolant is accommodated prior to activation of the inflator (10) and which has at least one coolant outlet orifice (28'). The coolant outlet orifice (28) is arranged in direct vicinity of the outlet orifice (22). Upon activation of the inflator (10) coolant flows out of the inflator into the protection system and wets an adjacent wall (32) of the protection system against which also the hot gas is flowing.

18 Claims, 4 Drawing Sheets

(56) References Cited

U.S. PATENT DOCUMENTS

| | | | |
|---|---|---|---|
| 2002/0158454 A1* | 10/2002 | Huber et al. | 280/736 |
| 2010/0013201 A1* | 1/2010 | Cox et al. | 280/741 |
| 2010/0176580 A1* | 7/2010 | Tauchen | 280/741 |
| 2010/0230942 A1* | 9/2010 | Rose et al. | 280/736 |
| 2011/0101662 A1 | 5/2011 | Rose et al. | |
| 2011/0221173 A1* | 9/2011 | Cox et al. | 280/736 |

FOREIGN PATENT DOCUMENTS

| | | |
|---|---|---|
| DE | 19726276 | 12/1998 |
| DE | 19913145 | 2/2000 |
| DE | 60102414 | 5/2005 |

* cited by examiner

INFLATOR, MODULE INCLUDING AN INFLATOR, VEHICLE SAFETY SYSTEM AND METHOD OF OPERATING A VEHICLE OCCUPANT PROTECTION SYSTEM

FIELD OF THE INVENTION

The invention relates to an inflator, especially for a vehicle occupant protection system.

In inflators comprising pyrotechnic propellants that generate hot gas used to operate a vehicle occupant protection system, such as a belt tensioner or an airbag, it is advantageous to protect adjacent parts of the protection system, for instance the inlet opening of the airbag or plugging material located in direct vicinity of the belt tensioner, against impact of heat by the escaping hot gas.

It is known to provide in the inflator a coolant reservoir for reducing the temperature of the escaping gas from which reservoir coolant flows into the interior of the inflator, the coolant being mixed with the hot gas generated from the pyrotechnic propellant there and thus being evaporated.

BACKGROUND OF THE INVENTION

The structure of such inflator is relatively complex, however, so that it is the object of the invention to provide a good protection against excessive impact of heat for a vehicle occupant protection system by an inflator having a simpler configuration.

This is achieved with an inflator comprising a housing in which a combustion chamber including a pyrotechnic propellant for generating hot gas is arranged and which has at least one escape orifice toward the environment of the inflator. In the housing a coolant reservoir is arranged in which prior to activation of the inflator coolant is accommodated and which includes at least one coolant outlet orifice, wherein at least one of the at least one coolant outlet orifice is arranged in direct vicinity of at least one of the at least one escape orifice. This configuration ensures that especially in a first gas escaping phase immediately after activation of the inflator such a large portion of coolant is contained in the gas flow exiting from the escape orifice that the environment of the escape orifice is wetted and/or cooled. In this way, for instance, the protection of an inlet opening of an airbag can be achieved by wetting and/or cooling the fabric of the airbag. Also other areas of the environment of the escape orifice, for instance other sections of an airbag wall or sections of plugging material, foams or a seat lining, against which the hot gas exiting the escape orifice is flowing can thus be protected from heat impact by the cooling and/or wetting performed in the starting phase of the gas escape.

The coolant can escape at least partially in liquid form from the escape orifice of the housing of the inflator. This is possible due to the direct spatial vicinity of the coolant outlet orifice to the escape orifice in the housing of the inflator, as in this way the escaping hot gas causes the coolant to be entrained and atomized during escaping.

Preferably the coolant is non-combustible. For instance, water including additives lowering the freezing point such as $CaCl_2$ can be used. What is important only is the fact that the coolant is liquid within a temperature range of from about −35 to +85° C., i.e. within the intended operating temperatures of an inflator in a vehicle.

BRIEF SUMMARY OF THE INVENTION

The inflator preferably is configured so that during a later gas outlet phase, during which hot gas in sufficient quantity for operating the vehicle occupant protection system still escapes from the escape orifice, the portion of the coolant contained in the escaping gas is lower than during the first gas outlet phase. The reason for this is that initially the coolant is to be brought into the environment of the inflator so as to effectuate, by wetting and cooling, protection of the materials against excessive heat impact by the later escaping hot gas.

The at least one of the at least one coolant outlet orifice in the coolant reservoir and at least one of the at least one escape orifice in the housing are located preferably at the same height with respect to an axial direction of the inflator.

Preferably the center of at least one of the at least one coolant outlet orifice and the center of at least one of the at least one escape orifice have a distance of no more than 5 mm, preferably 3 mm, especially 1 mm in the axial direction of the inflator.

The coolant outlet orifice and the escape orifice are preferably aligned in the housing of the inflator. Thus said orifices are arranged at the same position also along the circumference of the coolant reservoir and the inflator so that the coolant can leave the inflator substantially directly from the coolant reservoir through the escape orifice.

However, it is also possible to offset the coolant outlet orifice and the escape orifice against each other with respect to the circumference or, when providing plural orifices, to position some of them in alignment and some of them to be offset.

The escape orifice is advantageously arranged at the end of the coolant reservoir distant from the combustion chamber so that the escaping hot gas first has to flow past the coolant reservoir and the coolant can be entrained and atomized by the escaping hot gas.

The combustion chamber and the coolant reservoir are preferably arranged axially one after another.

The combustion chamber is advantageously separated from the area of the housing including the coolant reservoir by a reduction in cross-section in the housing. This can be an element having a passage with a diameter smaller than the inner diameter of the housing, especially a nozzle, a filter or the like. Due to the reduced cross-section the hot gas flowing out of the combustion chamber can be focused on a mechanism for forcing the coolant out of the coolant reservoir, for example. In this way, it is easy to influence the gas flows in the environment of the coolant reservoir. In order to influence the increase in pressure in the area of the coolant reservoir it is of advantage to close the flow orifice formed by the reduced cross-section by a bursting disk or plugging which is destroyed as soon as a predetermined pressure level is reached.

The coolant reservoir is preferably arranged in radial direction at a distance from the inside of the housing. It can be aligned for instance coaxially with respect to the housing. In this way the gas can flow out of the combustion chamber along the coolant reservoir to the escape orifice, the gas flow generating a vacuum which assists the liquid outlet from the coolant reservoir. Moreover swirls during the escape of the hot gas ensure that the coolant is entrained and that the coolant is atomized.

The reservoir can take 50 to 90% of the area in cross-section, for instance. The volume of the reservoir can be several cubic centimeters.

It is possible to provide plural coolant outlet orifices arranged successively in axial direction in the coolant reservoir and/or along the circumference of the coolant reservoir plural, preferably three, further preferably four, six or eight coolant outlet orifices or plural coolant outlet orifices arranged successively in axial direction can be provided in the coolant reservoir. For example, coolant outlet orifices can be arranged along the circumference of the coolant reservoir in the form of a ring, wherein a plurality of such rings may be provided axially one after another. In the individual rings the coolant outlet orifices can have different diameters or a different number of coolant outlet orifices can be provided in the rings. It is generally advantageous when, facing away from the combustion chamber, the total area of orifice in a ring of coolant outlet orifices is increased.

Escaping of the coolant can be assisted by a mechanism that is driven by the hot gas in the inflator and forces the coolant out of the coolant reservoir.

The coolant reservoir can have, for instance, a piston displaceable by the increasing internal pressure upon activation of the inflator by means of which the coolant can be forced out of the coolant reservoir.

An end face of the piston facing the combustion chamber can be curved either concavely or convexly. The forces acting on the piston and thus the displacing velocity of the piston, for instance, can be influenced by the configuration of the end face.

The piston may have a cavity. Further an end face of the piston facing the inside of the coolant reservoir can be closed by a diaphragm which seals the cavity. In this manner, the weight of the piston can be reduced. When the cavity is filled with gas or liquid, optionally an additional volume of coolant can be provided which possibly escapes from the coolant reservoir at a later point in time than the first escaping of coolant.

Prior to activation of the inflator, the coolant reservoir and the coolant outlet orifice, respectively, are sealed, as a matter of course, so that no coolant can leak into the inflator, for instance by a bursting disk.

It is also possible to configure the coolant reservoir so that it includes a wall adapted to be compressed in axial direction at least in portions. Here e.g. a smooth wall made of easily deformable material can be provided which no longer withstands the increasing internal pressure in the inflator upon activation thereof starting from a predetermined pressure level and is compressed so that the coolant is forced out of the coolant reservoir.

The coolant reservoir can also be in the form of bellows having folding zones along which the coolant reservoir yields in axial direction when the internal pressure increases in the inflator.

In both cases the coolant reservoir per se preferably has a substantially cylindrical form.

In the variants having a compressible wall preferably no displaceable piston is provided so that a mechanism can be saved.

The end face of the coolant reservoir can be curved concavely so as to facilitate deformation in the axial direction.

The invention moreover relates to a method of operating a vehicle occupant protection system comprising an inflator including a pyrotechnic propellant and a coolant reservoir disposed in the housing of the inflator as well as comprising a protection system operated by the hot gas escaping from the housing through at least one escape orifice, wherein after activation of the inflator coolant flows from the inflator into the protection system and wets an adjacent wall of the protection system against which also hot gas is flowing.

It is possible that at least part of the coolant escapes from the inflator in a liquid state, for instance atomized into small droplets. By the wetting a cooling and thus protection against excessive heat impact by the escaping hot gas is achieved in particular for the highly endangered parts of the protection system. This protection continues to exist even when the major part of the coolant has already left the inflator and still further hot gas escapes from the inflator, because the coolant has deposited already at the locations to be protected. In this way, an efficient protection can be achieved, although the hot gas escaping in later escaping phases is cooled no more or only to a small extent compared to the escaping gas in the first escaping phase.

Preferably, in the first gas escaping phase directly after activation of the inflator the concentration of coolant in the gas escaping from the inflator amounts to at least 50%.

The entire coolant preferably has left the inflator before inside the inflator (e.g. in the combustion chamber) the maximum pressure is reached. Thus the coolant in this case has almost completely left the inflator and the leaving gas flow contains only a very low concentration of coolant, before the maximum of the escaping amount of gas from the inflator is reached.

It is also possible that 50% to 95%, especially 65% to 75% of the entire coolant leave the inflator within a period of 5 ms to 10 ms after activation of the inflator.

Furthermore, the present invention comprises a module including an inflator, an airbag inflatable by the inflator and fastening means for mounting the module to a vehicle, the inflator being configured according to at least one of the foregoing features. The module and the fastening means are not shown in detail in the figures of the present invention, the inflatable airbag being indicated in FIG. 2 shown hereinafter at reference numeral 32 as a wall of a vehicle occupant protection system (not shown in detail).

Moreover, the present invention comprises a vehicle safety system, especially for the protection of a person, especially a vehicle occupant or pedestrian, comprising an inflator, an airbag inflatable by the same, as part of the module, and an electronic control unit by which the inflator can be activated when a trigger situation is given, wherein the inflator is configured according to at least one of the preceding features.

Hereinafter the invention is described in detail by way of plural embodiments and with reference to the enclosed figures in which

DETAILED DESCRIPTION

Figure 1:
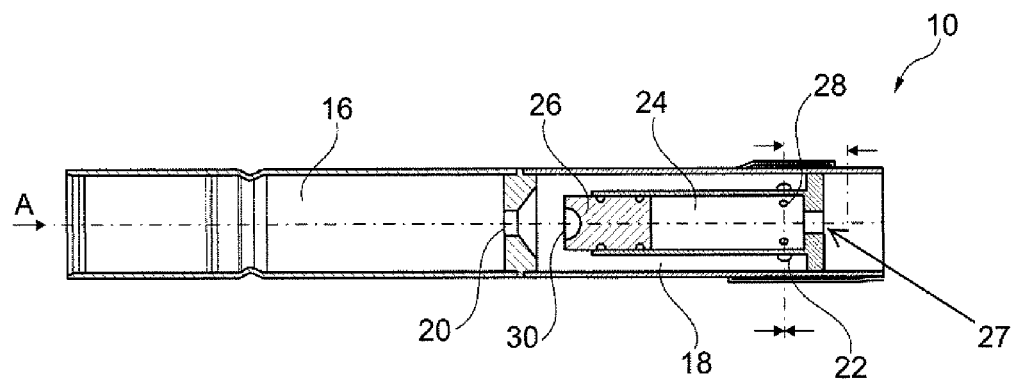
FIG. 1 shows a schematic sectional view of an inflator according to the invention in accordance with a first embodiment.

FIG. 1 shows an inflator 10 having a housing 12 which seals the inflator 10 against the environment. In the housing 12 a combustion chamber 16 is provided in which a pyrotechnic propellant not shown here is accommodated. The ignition of the pyrotechnic propellant for producing hot gas is carried out in a known way by an igniter (equally not shown) via which the inflator 10 can be activated.

In the axial direction A corresponding to the longitudinal axis of the inflator 10 another chamber 18 which is separated from the combustion chamber 16 by a wall having a reduction of cross-section 20 is connected to the combustion chamber 16. The reduction of cross-section 20 is in the form of a nozzle here and reduces the cross-section inside the housing 12 in a known way. Before the inflator 10 is activated, the combustion chamber 16 is separated from the chamber 18 by a bursting disk not shown here.

In the chamber 18 escape orifices 22 are formed in the housing 12 in ring shape at the end facing away from the combustion chamber 16. This is also clearly evident in the following figures.

In the chamber 18 a coolant reservoir 24 is arranged which in this example is arranged coaxially with respect to the housing 12 and has a cylindrical shape. Along the circumference the coolant reservoir 24 is spaced from the inside of the housing 12 so that a flow path is formed from the combustion chamber to the escape orifices 22. An annular chamber is formed between the outer wall of the coolant reservoir 24 and the inner wall of the chamber 18.

The end of the coolant reservoir 24 facing the combustion chamber 16 is closed by a movable piston 26. At the other axial end the coolant reservoir 24 has a filling orifice 27 which is sealed after filling with an appropriate coolant.

The coolant used can be, for instance, water including an additive lowering the freezing point such as $CaCl_2$. Other suited coolants can be used as well.

At its end facing away from the piston 26 the coolant reservoir 24 has a plurality of coolant outlet orifices 28 located at the same axial height.

In the axial direction A the coolant outlet orifices 28 are arranged level with the escape orifices 22. In the shown example the coolant outlet orifices 28 are also aligned with the escape orifices 22 so that the coolant from the coolant reservoir 24 can escape in a direct line from the inflator 10.

The coolant outlet orifices 28 and preferably also the reduction of cross-section 20 are sealed in a gastight manner by bursting disks or plugging before the inflator is activated.

In the example shown here the end face 30 of the piston 26 facing the combustion chamber 16 has a concave shape.

Upon activating the inflator 10 the propellant is ignited in the combustion chamber 16 and starts to develop hot gas. The hot gas flows into the chamber 18 and from there leaves the housing 12 through the escape orifices 22. As long as the plugging over the coolant outlet orifices 28 is still intact, the piston 26 cannot move in the axial direction A despite the pressure increasing in the chamber 18, because the coolant is incompressible. However, a vacuum is formed by the hot gas flowing past the coolant chamber 24 in the area of the coolant outlet orifice 28, which results in the fact that the pressure acting inside the coolant reservoir 24 becomes so high that the plugging over the coolant outlet orifices 28 breaks. From this point in time the still increasing internal pressure inside the chamber 18 also moves the piston 26 in the axial direction and the coolant, on the one hand, is forced out of the coolant reservoir 24 by the movement of the piston 26 and, on the other hand, is entrained by the hot gas flow along the coolant outlet orifices 28 from the coolant reservoir 24.

Due to the high flow velocity as well as the creation of swirls, at least part of the coolant leaving the coolant reservoir 24 can be atomized into small droplets so that part of the coolant can evaporate. The escaping hot gas is cooled by the evaporation heat.

Further, by the evaporation of part of the coolant the escaping gas volume increases so that the entire escaping gas volume is increased.

In a first escaping phase directly after activation of the inflator in this example practically the entire coolant is forced out of the coolant reservoir 24 and of the inflator 10. The major part up to the whole of the coolant may have left the inflator 10 already before the maximum pressure of hot gas is reached in the combustion chamber 16. In this way 50% to 95%, especially 65% to 75%, of the entire coolant can escape from the inflator within a period of 5 ms to 10 ms after activation of the inflator. The massive escape of coolant, wherein the coolant concentration can amount to 50% and more in the escaping gas flow, causes a wetting of the walls 32 of a vehicle occupant protection system (not shown in detail) by droplets 34 of the coolant.

The wall 32 is, for example, a wall of an airbag, e.g. in the area of the inlet opening, or else a plugging in a vehicle column, a foam in a vehicle seat or a fabric in the vehicle.

When in a later escaping phase the concentration of the coolant in the escaping gas definitely subsides and substantially only hot gas leaves the inflator 10, the wetting of the walls 32 still ensures protection from an excessive heat impact by the hot gas which still flows against the walls 32.

Figure 3:
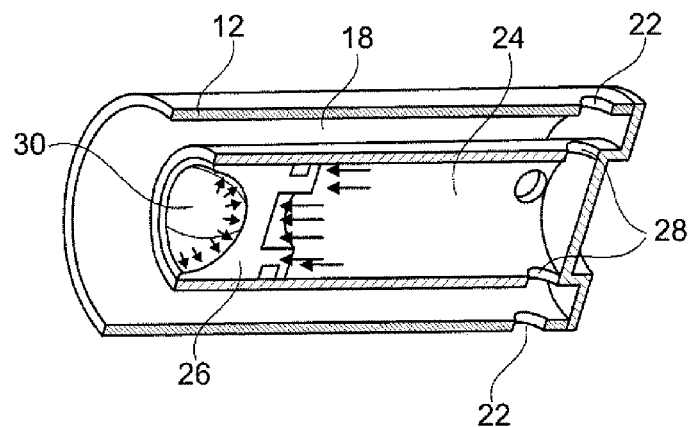
FIGS. 3 and 4 show further schematic perspective sectional views of a portion of the inflator of FIG. 1.

FIG. 3 illustrates the pressure conditions in the coolant reservoir 24 prior to opening the plugging of the coolant outlet orifices 28.

Figure 2:
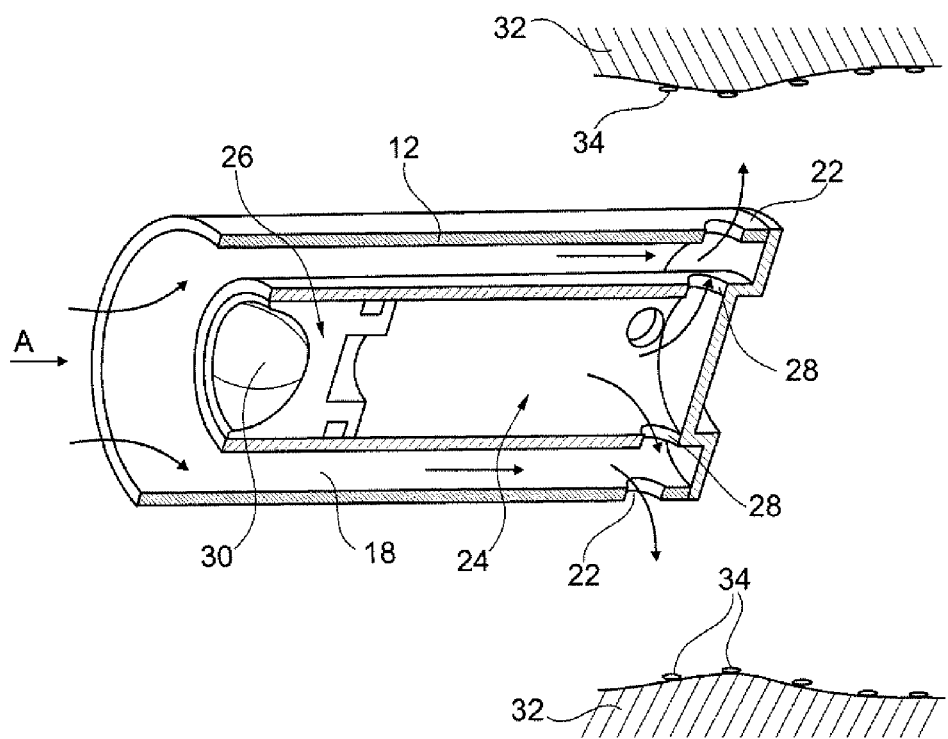
FIG. 2 shows a schematic perspective sectional view of a portion of the inflator of FIG. 1 as well as a cut-out of a vehicle occupant protection system in the environment of the inflator.

As soon as the latter are opened, the pressure prevailing in the chamber 18 moves the piston 26 in the axial direction A in the direction of the coolant outlet orifices 28 and thus forces the coolant out of the coolant outlet orifices 28 and, as the escape orifices 22 are aligned with the latter, directly out of the inflator 10 (see FIG. 2).

Figure 4:
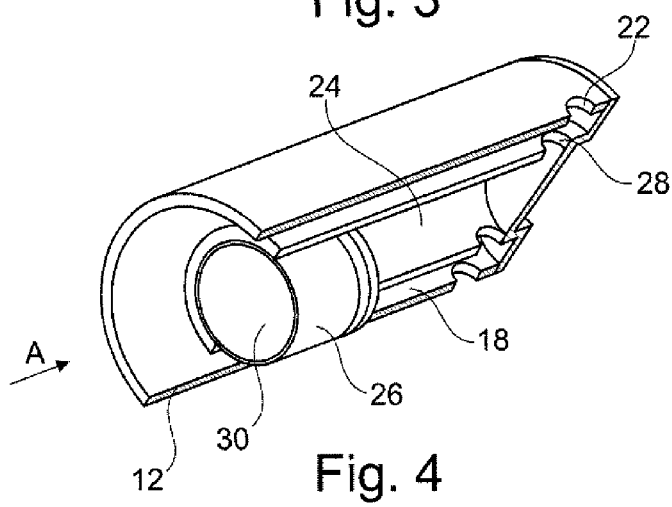

FIG. 4 shows that the piston 26 has a cylindrical outer circumference and moves in the axial direction A in the coolant reservoir 24.

Figure 5:
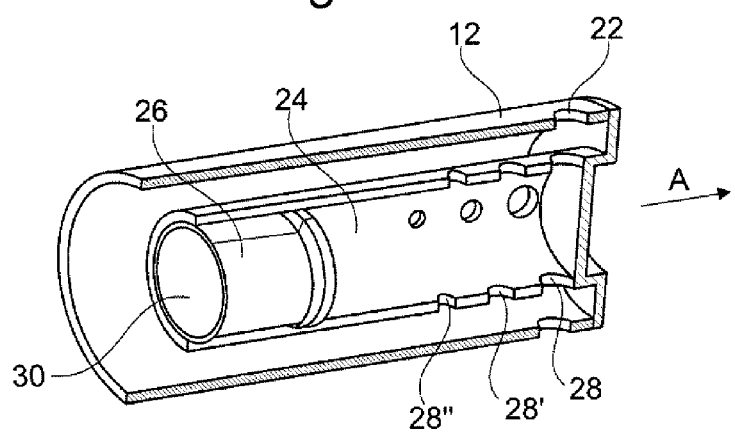
FIG. 5 shows a schematic perspective sectional view of a portion of an inflator according to the invention in accordance with a second embodiment.

In the variant of the coolant reservoir 24 shown in FIG. 5 plural coolant outlet orifices 28 are arranged along the circumference of the coolant reservoir 24 in the form of a ring, wherein a plurality of such rings is provided axially one after another each having plural coolant outlet orifices 28, all coolant outlet orifices 28 of one ring being disposed at the same axial height. As in the just described example, the coolant outlet orifices 28 most distant from the combustion chamber 16 are located level with the escape orifices 22 in the housing 12. In this case, however, two further rings of coolant outlet orifices 28', 28" are provided which are arranged to be closer toward the combustion chamber 16. In the circumferential direction each of the coolant outlet orifices 28, 28', 28" has the same positioning but all of the coolant outlet orifices 28" have a smaller diameter than the coolant outlet orifices 28' all of which in turn have a smaller diameter than the coolant outlet orifices 28.

The coolant leaving the coolant outlet orifices 28', 28" is mixed more strongly in the annular chamber around the coolant reservoir 24 with the hot gas flowing past the coolant reservoir 24 than the coolant leaving the coolant outlet orifices 28. Consequently, in this embodiment a higher portion of the coolant will be transformed into the vapor phase than in the one described before.

Figure 6:
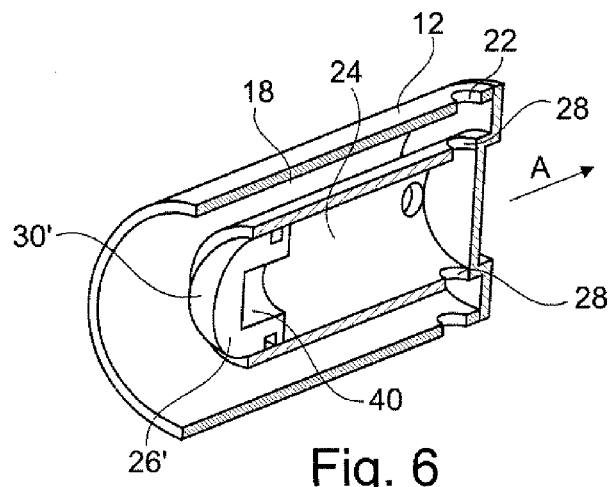
FIG. 6 shows a schematic perspective sectional view of a portion of an inflator according to the invention in accordance with a third embodiment.
Figures 7, 8:
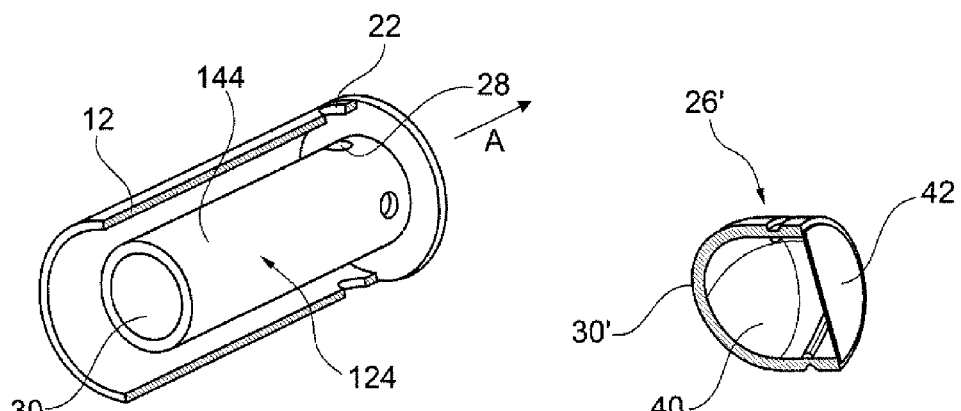
FIG. 7 shows a schematic perspective sectional view of a piston of the inflator of FIG. 6.
FIG. 8 shows a schematic perspective and partly cut view of a portion of an inflator according to the invention in accordance with a fourth embodiment.

The FIGS. 6 and 7 show an inflator including a variant of the piston 26. In this case the piston 26' is convexly curved at its end face 30' facing the combustion chamber 16. Inside the piston 26' a cavity 40 is formed which is closed by a bursting disk 42 before the inflator 10 is activated (cf. FIG. 7). The cavity 40 can be filled with gas, for instance air, in order to reduce the weight of the piston 26. It is also possible to fill the same coolant as or a coolant different from that of the remaining coolant reservoir 24 into the cavity 40, wherein after bursting of the bursting disk, for instance because of hitting the other end of the coolant reservoir 24, a further reservoir of coolant is optionally released.

The functioning of the inflator is as described above.

Figure 9:
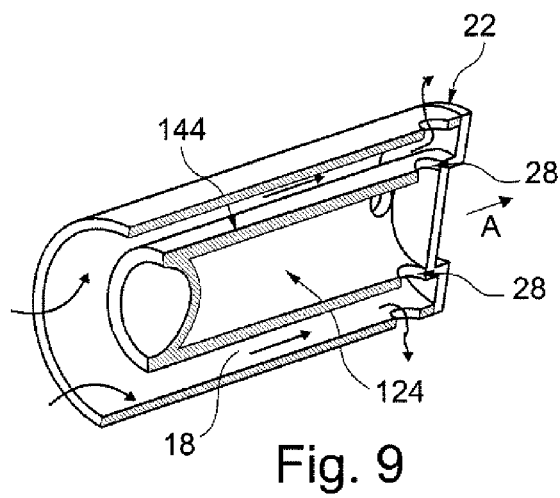
FIG. 9 shows the inflator of FIG. 8 in a schematic perspective sectional view in which the flow conditions inside the inflator are illustrated.

FIGS. 8 and 9 illustrate another variant in which the coolant reservoir 124 is formed to have a wall adapted to be compressed in portions. The cylindrical wall 144 of the coolant reservoir 124 is formed completely or in portions of a deformable material, for instance a thin sheet. The end face 30 concavely curved in this case is made of a material, on the other hand, which does not deform under the effect of pressure.

The action of force onto the end face 30 of the coolant reservoir 24 can be varied by the curvature (convex or concave) as well as the radius of curvature and thus the force threshold for deforming the wall 144 can be adjusted.

When a predetermined pressure threshold in the chamber 18 is exceeded, the end face 30 moves away from the combustion chamber 16 in the axial direction A and deforms the wall 144, wherein the coolant is forced out of the coolant outlet orifices 28.

Figure 10:
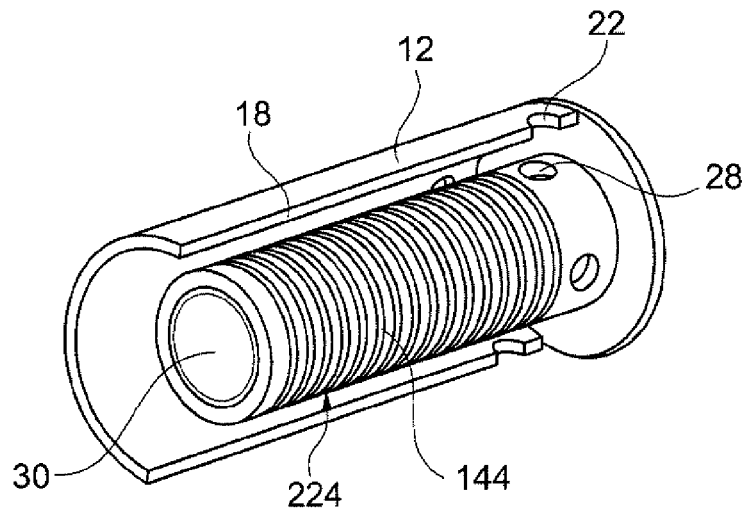
FIG. 10 shows a schematic perspective and partly cut view of a portion of an inflator according to the invention in accordance with a fifth embodiment.
Figure 11:
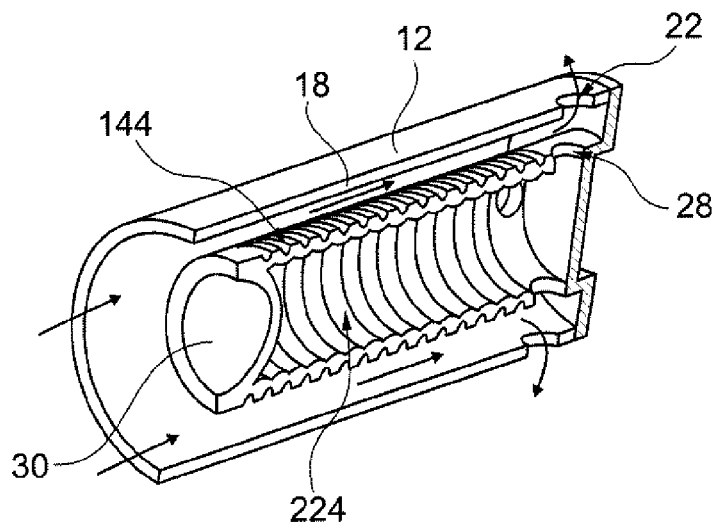
FIG. 11 shows a schematic perspective sectional view of the inflator in FIG. 10 in which the flow conditions are illustrated.
Figure 12:
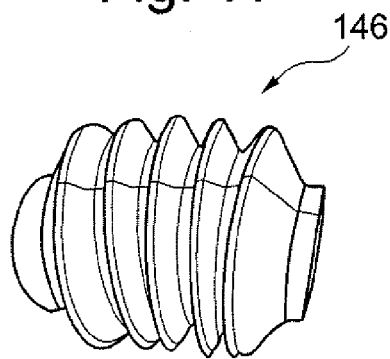
FIG. 12 shows a schematic perspective view of a coolant reservoir in the form of bellows for use in an inflator illustrated in FIGS. 10 and 11.

In the variant shown in FIGS. 10 to 12 the deformable wall 144 has the form of bellows, wherein the predetermined folding positions yield under the effect of pressure so that the axial length of the coolant reservoir 224 is reduced and the coolant is forced out. In this case the coolant is filled into the coolant reservoir 224 under pressure so that the bellows 146 are extended. In this condition the coolant reservoir 224 is closed. The filled condition is shown in the FIGS. 10 and 11.

Concerning the coolant reservoir 24 it is still noted that before activation of the inflator 10 the coolant reservoir 24 can extend at least partially into the piston 26 so that an inner area of the piston 26 is filled with coolant. This is the case, for example, in FIG. 2. There the piston 26 has a recess (not defined in detail) at its end face facing the coolant reservoir 24. This recess is preferably filled with coolant and thus also forms a partial area of the coolant reservoir 24. Accordingly, in FIG. 7 the cavity 40 of the piston 26' cannot be covered by a bursting disk 42, either, so that the cavity 40 is arranged to be open toward the coolant reservoir 24 and is filled with coolant.

At the discretion of those skilled in the art all features of the individual embodiments are adapted to be combined with each other or to be exchanged for each other.

The invention claimed is:

1. An inflator for a vehicle occupant protection system, comprising a housing (12) in which a combustion chamber (16) containing a pyrotechnic propellant is arranged in which combustion chamber hot gas can be generated and which includes at least one escape orifice (22) directed radially toward the environment of the inflator (10), and a coolant reservoir (24; 124; 224) arranged in the housing (12) in which coolant is accommodated prior to activation of the inflator (10) and which has at least one coolant outlet orifice (28; 28'; 28"), wherein at least one of the at least one coolant outlet orifice (28; 28', 28") is directed radially on the coolant reservoir (24; 124; 224) in direct vicinity of at least one of the at least one escape orifice (22); and wherein at least one of the at least one coolant outlet orifice (28; 28', 28") in the coolant reservoir (24; 124; 224) and at least one of the at least one escape orifice (22) in the housing (12) are located at the same height in the axial direction (A) of the inflator (10).

2. The inflator according to claim 1, wherein the combustion chamber (16) is separated from the area of the housing (12) containing the coolant reservoir (24; 124; 224) by a reduction of cross-section (20) in the housing (12) that includes a nozzle having a passage with a diameter which is smaller than an inner diameter of the housing (12).

3. The inflator according to claim 1, wherein the coolant reservoir (124; 224) includes a wall (144) adapted to be compressed in the axial direction (A) at least in portions, especially by the generated hot gas.

4. A module comprising an inflator (10), an airbag inflatable by the inflator (10) and a fastening mechanism to mount the module to a vehicle, where the inflator (10) is configured according to claim 1.

5. A vehicle safety system, especially for the protection of a person, for instance a vehicle occupant or pedestrian, comprising an inflator (10), an airbag inflatable by the same, as part of the vehicle safety system, and an electronic control unit by means of which the inflator (10) is adapted to be activated when a trigger situation is provided, wherein the inflator (10) is configured according to claim 1.

6. An inflator for a vehicle occupant protection system, comprising a housing (12) in which a combustion chamber (16) containing a pyrotechnic propellant is arranged in which combustion chamber hot gas can be generated and which includes at least one escape orifice (22) directed radially toward the environment of the inflator (10), and a coolant reservoir (24; 124; 224) arranged in the housing (12) in which coolant is accommodated prior to activation of the inflator (10) and which has at least one coolant outlet orifice (28; 28'; 28"), wherein at least one of the at least one coolant outlet orifice (28; 28', 28") is directed radially on the coolant reservoir (24; 124; 224) in direct vicinity of at least one of the at least one escape orifice (22); and wherein the center of at least one of the at least one coolant outlet orifice (28; 28', 28") and the center of at least one of the at least one escape orifice (22) in the axial direction (A) of the inflator (10) have a distance of not more than 5 mm.

7. A module comprising an inflator (10), an airbag inflatable by the inflator (10) and a fastening mechanism to mount the module to a vehicle, where the inflator (10) is configured according to claim 6.

8. An inflator for a vehicle occupant protection system, comprising a housing (12) in which a combustion chamber (16) containing a pyrotechnic propellant is arranged in which combustion chamber hot gas can be generated and which includes at least one escape orifice (22) directed radially toward the environment of the inflator (10), and a coolant reservoir (24; 124; 224) arranged in the housing (12) in which coolant is accommodated prior to activation of the inflator (10) and which has at least one coolant outlet orifice (28; 28'; 28"), wherein at least one of the at least one coolant outlet orifice (28; 28', 28") is directed radially on the coolant reservoir (24; 124; 224) in direct vicinity of at least one of the at least one escape orifice (22); and wherein the combustion chamber (16) and the coolant reservoir (24; 124; 224) are arranged axially one after another and/or that the coolant reservoir (24; 124; 224) is arranged in the radial direction at a distance from the inside of the housing (12).

9. A module comprising an inflator (10), an airbag inflatable by the inflator (10) and a fastening mechanism to mount the module to a vehicle, where the inflator (10) is configured according to claim 8.

10. An inflator for a vehicle occupant protection system, comprising a housing (12) in which a combustion chamber (16) containing a pyrotechnic propellant is arranged in which combustion chamber hot gas can be generated and which includes at least one escape orifice (22) directed radially toward the environment of the inflator (10), and a coolant reservoir (24; 124; 224) arranged in the housing (12) in which coolant is accommodated prior to activation of the inflator (10) and which has at least one coolant outlet orifice (28; 28'; 28"), wherein at least one of the at least one coolant outlet orifice (28; 28', 28") is directed radially on the coolant reservoir (24; 124; 224) in direct vicinity of at least one of the at least one escape orifice (22); and wherein plural coolant outlet orifices (28; 28', 28") successively arranged in axial direction (A) are provided in the coolant reservoir (24).

11. A module comprising an inflator (10), an airbag inflatable by the inflator (10) and a fastening mechanism to mount the module to a vehicle, where the inflator (10) is configured according to claim 10.

12. An inflator for a vehicle occupant protection system, comprising a housing (12) in which a combustion chamber (16) containing a pyrotechnic propellant is arranged in which combustion chamber hot gas can be generated and which includes at least one escape orifice (22) directed radially toward the environment of the inflator (10), and a coolant reservoir (24; 124; 224) arranged in the housing (12) in which coolant is accommodated prior to activation of the inflator (10) and which has at least one coolant outlet orifice (28; 28'; 28"), wherein at least one of the at least one coolant outlet orifice (28; 28', 28") is directed radially on the coolant reservoir (24; 124; 224) in direct vicinity of at least one of the at least one escape orifice (22); and wherein the at least one coolant orifice (28; 28', 28") is radially aligned with the at least one escape orifice (22) so that the coolant exits the coolant reservoir (24; 124; 224) and mixes with the hot gas, the mixture of the coolant and hot gas exiting the housing (12) radially through the at least one escape orifice (22).

13. An inflator for a vehicle occupant protection system, comprising a housing (12) in which a combustion chamber (16) containing a pyrotechnic propellant is arranged in which combustion chamber hot gas can be generated and which includes at least one escape orifice (22) directed radially toward the environment of the inflator (10), and a coolant reservoir (24; 124; 224) arranged in the housing (12) in which coolant is accommodated prior to activation of the inflator (10) and which has at least one coolant outlet orifice (28; 28'; 28"), wherein at least one of the at least one coolant outlet orifice (28; 28', 28") is directed radially on the coolant reservoir (24; 124; 224) in direct vicinity of at least one of the at least one escape orifice (22);

wherein plural coolant outlet orifices (28; 28', 28") successively arranged in axial direction (A) are provided in the coolant reservoir (24); and wherein the plural coolant outlet orifices (28; 28', 28") are successively arranged in axial direction (A) along the circumference of the coolant reservoir (24; 124; 224).

14. An inflator for a vehicle occupant protection system, comprising a housing (12) in which a combustion chamber (16) containing a pyrotechnic propellant is arranged in which combustion chamber hot gas can be generated and which includes at least one escape orifice (22) directed radially toward the environment of the inflator (10), and a coolant reservoir (24; 124; 224) arranged in the housing (12) in which coolant is accommodated prior to activation of the inflator (10) and which has at least one coolant outlet orifice (28; 28'; 28"), wherein at least one of the at least one coolant outlet orifice (28; 28', 28") is directed radially on the coolant reservoir (24; 124; 224) in direct vicinity of at least one of the at least one escape orifice (22); and wherein the coolant reservoir (24) has a piston (26; 26') displaceable by the increasing internal pressure upon activation of the inflator (10) by means of which piston the coolant can be forced out of the coolant reservoir (24), and/or characterized in that an end face (30; 30') of the piston (26; 26') facing the combustion chamber (16) is curved either concavely or convexly, wherein the piston (26') has a cavity (40) and an end face of the piston (26') facing the inside of the coolant reservoir (24) is closed by a diaphragm (42) which seals the cavity (40).

15. A module comprising an inflator (10), an airbag inflatable by the inflator (10) and a fastening mechanism to mount the module to a vehicle, where the inflator (10) is configured according to claim 14.

16. An inflator for a vehicle occupant protection system, comprising:

a combustion chamber (16) containing a pyrotechnic propellant in which hot gas can be generated;

a second chamber (18) including at least one escape orifice (22) that provides a direct line into the environment of the inflator (10);

a nozzle that provides fluid communication between the combustion chamber (16) and the second chamber (18); and a coolant reservoir (24; 124; 224) disposed within the second chamber (18), the coolant reservoir (24; 124; 224) including at least one coolant outlet orifice (28; 28', 28") for directing coolant into the second chamber (18) to cool the hot gas;

wherein the at least one escape orifice (22) is arranged annularly about a side wall of the second chamber (18); the at least one coolant outlet orifice (28; 28', 28") is arranged annularly about a sidewall of the coolant reservoir (24; 124; 224); and at least a portion of the at least one escape orifice (22) and the at least one coolant outlet orifice (28; 28', 28") are radially aligned with each other.

17. The inflator of claim 16, wherein at least one of the at least one coolant outlet orifice (28; 28', 28") is arranged in direct vicinity of at least one of the at least one escape orifice (22).

18. The inflator of claim 16, wherein the coolant reservoir (24; 124; 224) defines an annular space within the second chamber (18), the nozzle directing hot gas from the combustion chamber (16) into the annular space.

* * * * *